United States Patent

[11] 3,578,183

| [72] | Inventor | Nelson N. Larger |
| | | Salisbury, Md. |
| [21] | Appl. No. | 803,584 |
| [22] | Filed | Mar. 3, 1969 |
| [45] | Patented | May 11, 1971 |
| [73] | Assignee | A. W. Perdue & Son, Inc. |
| | | Salisbury, Md. |

[54] METHOD AND APPARATUS FOR CONVEYING MATERIAL
17 Claims, 6 Drawing Figs.

[52] U.S. Cl. ................................................. 214/17,
198/45, 198/77, 198/96, 198/141, 198/152, 214/152
[51] Int. Cl. ............................................. B65g 65/42
[50] Field of Search ...................................... 198/45, 65, 77, 96, 126, 141, 152; 214/17.8, 17.82, 17.84

[56] References Cited
UNITED STATES PATENTS

| 854,626 | 5/1907 | Blaisdell | 198/77 |
| 2,516,968 | 8/1950 | Faler | 198/141X |
| 2,791,887 | 5/1957 | Hennig | 214/17(.84)X |
| 3,121,488 | 2/1964 | Chittock | 214/17(.84)UX |
| 3,235,102 | 2/1966 | Chapman | 214/17(.84) |

*Primary Examiner*—Robert G. Sheridan
*Attorney*—Beveridge & De Grandi

ABSTRACT: Unloading material such as ice from a storage room by gradually moving a vertical conveyor horizontally against a supply of ice to raise portions of the ice and deposit the same at the top of the conveyor into a chute mounted on the conveyor to convey the ice downwardly onto a horizontal conveyor which leads out of the storage room. A plurality of bucket members are secured to vertically movable endless drive members in the vertical conveyor for picking up, raising and then discharging portions of the ice into the chute, the bucket members also having a plurality of prongs for scarifying the ice. The vertical conveyor is moved against the ice by means of an overhead trolley from which the conveyor is suspended, the overhead trolley being movable along a horizontal track under the power of a motor which also is employed to drive the endless members. In one embodiment, an agitating mechanism is mounted on the top of the vertical conveyor to be movable therewith by means of the trolley.

INVENTOR
NELSON N. LARGER

BY Browe, Schuyler & Beveridge
ATTORNEYS

Patented May 11, 1971

INVENTOR
NELSON N. LARGER

BY Browne, Schuyler & Beveridge
ATTORNEYS

INVENTOR
NELSON N. LARGER

BY Browne, Schuyler & Beveridge
ATTORNEYS

3,578,183

METHOD AND APPARATUS FOR CONVEYING MATERIAL

SUMMARY OF THE INVENTION

The present invention relates to a novel method and apparatus for conveying material. Although the present invention is particularly useful in unloading ice from an ice storage room as will be described in detail below, the present invention is not restricted to such use.

One of the objects of the present invention is to provide an improved method and apparatus for conveying material particularly useful in unloading large quantities of ice shavings from an ice storage room. Included herein is the provision of such apparatus which will successfully unload even through portions of the ice shavings have frozen into bulks.

A further object of the present invention is to provide a new method and apparatus which may be employed to unload material in relatively great quantities without breakdown over long periods of use.

A further object of the present invention is to provide such apparatus which may be easily operated and controlled.

The above and other objects are achieved by a vertical conveyor including a pair of parallel endless drive members mounted on a frame for vertical movement and a plurality of bucket members extending transversely of and connected to the endless members to be driven thereby. For receiving and depositing material such as ice shavings, the bucket members have an open mouth. In addition, the sides of the bucket members which face the material during operation are provided with prongs for scarifying the ice to loosen it in the event it is frozen into bulks.

Material collected by the bucket members during their upward movement is deposited into a vertical chute the open end of which lies below the path of the bucket members as they reach their uppermost point of travel where the mouths of the bucket members face downwardly to allow the material to be discharged into the chute. The chute is mounted to the frame between the opposite runs of the endless members and converges downwardly to an outlet which discharges the material onto a horizontal conveyor which conveys the material away from the vertical conveyor.

In use, the vertical conveyor is moved horizontally in a gradual process against a pile of material which is to be conveyed. Horizontal movement of the vertical conveyor is achieved by means of an overhead trolley from which the conveyor frame is suspended. In the preferred embodiment, the frame is suspended so that the endless drive members extend at a slight angle to the true vertical. The trolley moves on an overhead track by means of rollers and under the power of a motor which is also operatively connected to the endless drive members to drive the same. If desired such as when the conveyor is employed to unload ice, an agitator mechanism may be mounted on the top of the vertical conveyor frame to loosen ice which has frozen into bulk form. When employed in an ice storage room, the vertical conveyor may be mounted between an ice inlet screw which conveys ice shavings into the ice room at the top of the ice room, and an outlet conveyor in the floor of the ice room which receives the ice from the chute of the vertical conveyor.

Other objects and advantages will become apparent from the following more detailed description taken in conjunction with the attached drawings in which.

DETAILED DESCRIPTION

Figure 1:
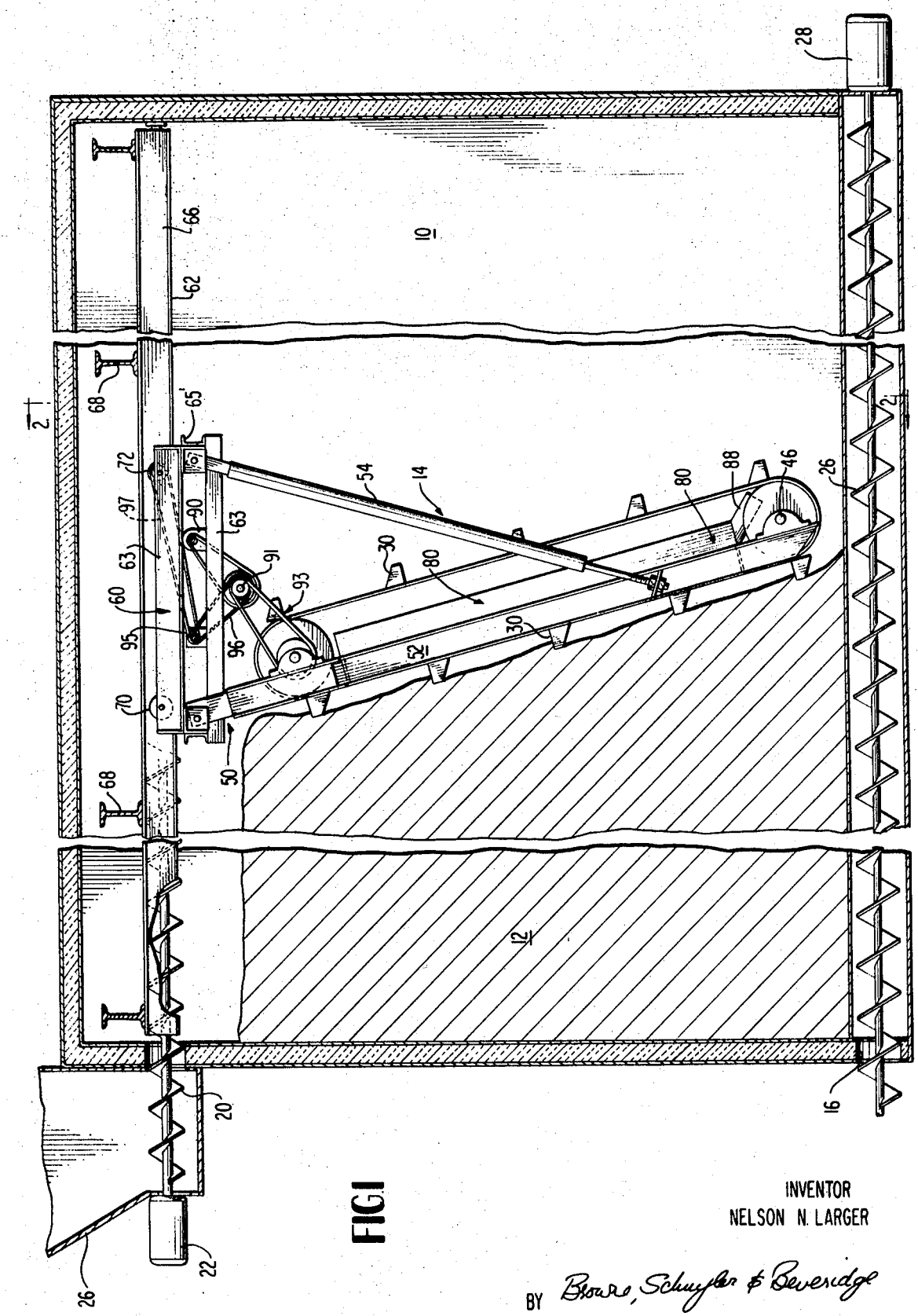
FIG. 1 is a longitudinal cross-sectional view of an ice storage room containing conveyor apparatus for discharging ice shavings from the room, with intermediate sections of the room being broken away.

Referring now to the drawings in detail there is shown for illustration purposes only, an ice storage room generally designated 10 containing a pile of ice shavings 12 and apparatus generally designated 14 embodying the invention for removing the ice shavings from the room through an outlet 16 in an end wall 18 of the room. Ice is fed into room 10 in the form of ice shavings by means of an elongated conveyor screw 20 driven by a motor 22 and being mounted in the top portion of the ice room to extend longitudinally therein generally in the center of the room. Conveyor screw 20 extends through an inlet passage 24 in end wall 18 so as to feed ice shavings from an inlet hopper 26 through inlet passage 24 and into the room. The illustration of ice 12 in FIG. 1 represents an accumulation of the ice fed into the room through means of conveyor screw 20.

Conveyance of the ice shavings out of the room through discharge passage 16 is achieved through means of a discharge screw generally designated 26 mounted in the floor 28 of the ice room in alignment below feed screw 20. Discharge screw 26 may be driven by any suitable motor 28 indicated in FIG. 1. The feed and discharge screws 20 and 26 themselves may have any conventional construction well known in the conveying art and therefore need not be described further.

Figure 4:
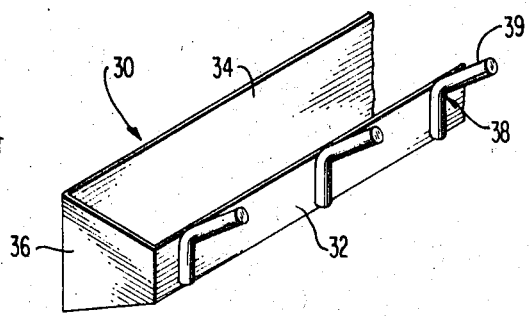
FIG. 4 is a fragmental perspective view of a trough employed in the apparatus for picking up and discharging ice shavings.

In accordance with the present invention, ice is removed from the pile 12 shown in FIG. 1 and discharged downwardly on discharge screw 26 through means of apparatus 14 which may be broadly termed a vertical conveyor. The latter includes a plurality of elongated troughs or buckets 30 which extend transversely across the ice room at different elevations and in parallel relationship to each other. Buckets 30 may be made from sheet steel and in the specific form shown in FIG. 4 have a generally trapezoidal shape including a rectangular front sidewall 32, a rectangular rear sidewall 34 of larger area than front wall 32 and opposite identical trapezoidal end walls 36 interconnecting the sidewalls 32, 34. Rigidly fixed on front wall 32 in longitudinally spaced relation, are a plurality of steel prongs 38 for scarifying the ice as will be further described. Projecting portions 39 of the prongs in the specific embodiment, extend at an angle of about 30° (degrees) with respect to the horizontal.

Bucket members 30 are movable vertically in an endless path to pick up ice from pile 12 and to discharge it downwardly at an uppermost point in their travel. Such movement of the bucket members is achieved through a plurality of endless drive members 40 which may be chains trained about sprockets 42, 43 mounted on upper and lower horizontal shafts 44, 46 which in turn are rotatably mounted by any suitable bearings in a frame generally designated 50. It is preferred that buckets 30 extend beyond the drive members as indicated in the shown embodiment to avoid ice buildup which may obstruct forward movement of the vertical conveyor as will be further explained. The particular length of buckets 30 may be varied of course in accordance with the width of the ice storage room.

In the shown embodiment, frame 50 includes vertical steel channel members 52 which preferably extend at an angle of about 20° (degrees) with respect to the vertical and serve to mount sprocket shafts 44, 46; and a pair of rear struts 54 secured at their lower ends to portions of the channel members 52 by means of arms 56 which rigidly project from the channel members. The upper ends of main channel members 52 and struts 54 are suspended from an overhead trolley or carriage generally designated 60 which is mounted for horizontal sliding movement on an overhead track formed by the flanges 62 of beams 66. The latter extend in parallel longitudinally below the ceiling of the ice storage room and in the shown embodiment are secured to overlying parallel cross beams 68 supported in the sidewalls of the ice room. To accommodate movement of bucket members 30 along their upper arc of travel, main channel members 52 are offset outwardly as indicated at 53 in FIG. 2 to provide sufficient space to receive the ends of bucket members 30 as they move over the upper sprocket to discharge the ice.

Carriage 60 may have any suitable construction including side and end channel members 63, 65 fixed to each other to form a rectangular frame with front and rear rollers 70, 72 supported in side members 65 to be movable on flanges 62 of beams 66 as shown. Carriage frame further includes a lower frame comprised of side and end channel members 63' and 65' and to which support members 52 and 54 are connected.

Ice picked up by buckets 30 during their upward travel against the pile of ice shown in FIG. 1, is deposited as the buckets move about upper sprockets 42 into a transfer chute 80 secured to main channels 52 of the vertical conveyor. In the specific embodiment shown, chute 80 has a rectangular cross section which at its upper end is uniform and extends substantially across the conveyor as illustrated in FIG. 1, and at its lower end, decreases towards an outlet passage 82 formed in the chute at its lower end. Thus chute 80 is formed by planar front and rear parallel walls 84 interconnected by narrow parallel sidewalls 86 the lower portions of which converge towards the chute outlet passage 82. Chute may be formed from any suitable sheet material such as sheet steel, and it will be noted that it is secured to main channels members 52 of the vertical conveyor to lie parallel to the plane of the channel members 52.

The upper end of chute 80 is open to receive the ice discharged from buckets 30 after which the ice moves downwardly by gravity to outlet passage 82 which directs the ice on discharge screw 26 for conveyance out of the storage plant. In the illustrated embodiment, the lower end of chute 80 projects rearwardly at about a 45° (degree) angle to the plane of the chute so as to form a spout 88 which will guide the ice in a desired direction to avoid contact with the lower sprocket shaft 46.

Figure 2:
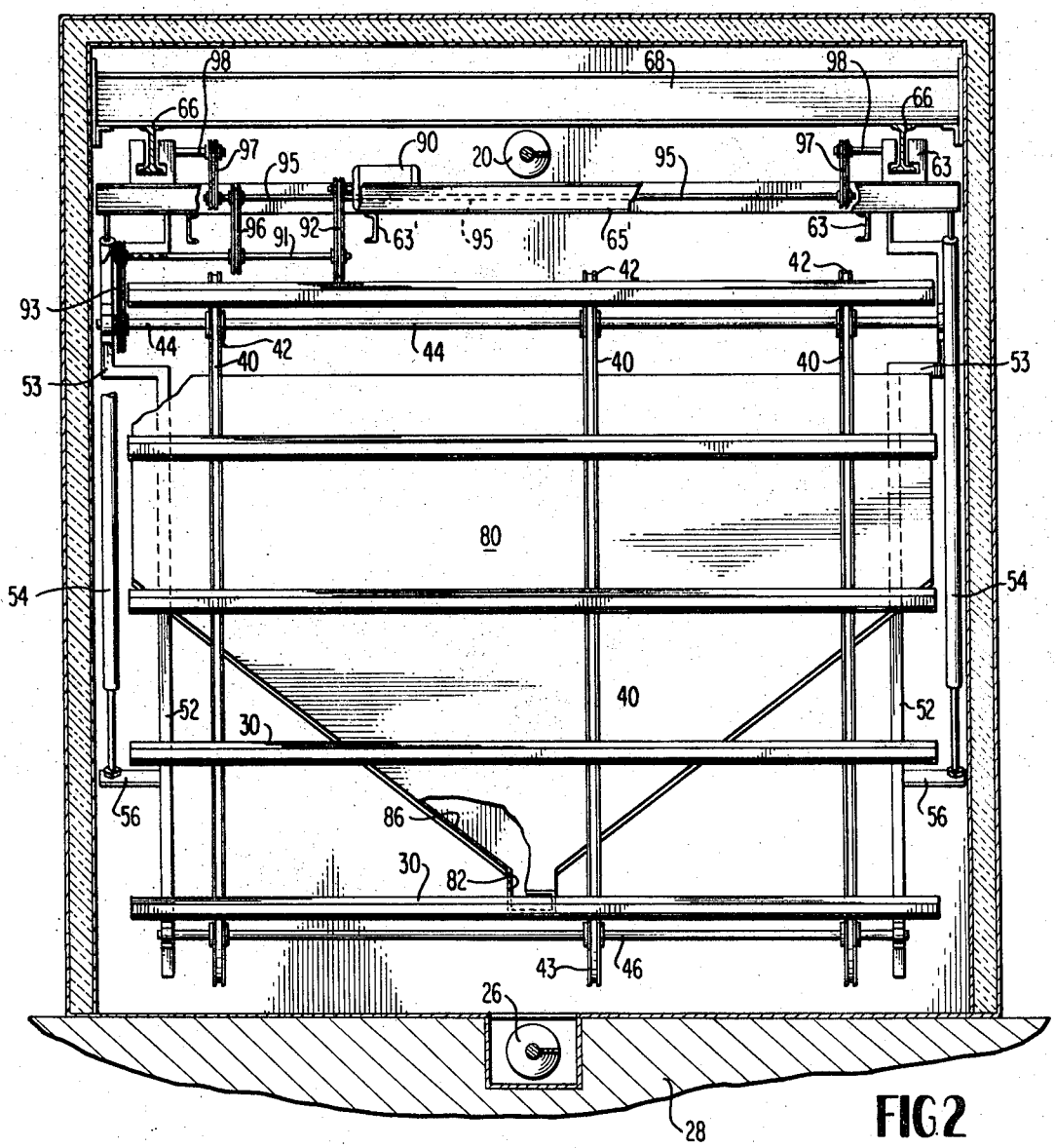
FIG. 2 is a cross-sectional view taken generally along lines 2-2 of FIG. 1.

Referring to FIGS. 1 and 2, endless drive members 40 are operated by a motor 90 suitably mounted in the overhead carriage 60 as indicated in FIGS. 1 and 2. Motor 90 is operatively connected to upper sprockets 42 to drive the same by means of a transfer shaft 91 and a belt and pulley transmission generally designated 92. Transfer shaft 92 is operatively connected to the upper sprocket shaft 44 by means of belt and pulley transmission generally designated 93.

Motor 90 is also employed to move carriage 60 along tracks 62 to advance the bucket members 30 forwardly into the ice pile 12. This is achieved through a second transfer shaft 95 which is operatively connected to the first transfer shaft 91 by a belt and pulley transmission 96. The second transfer shaft 95 is operatively connected at its opposite ends by belt and pulley transmissions 97 which drive roller shafts 98.

Figure 3:
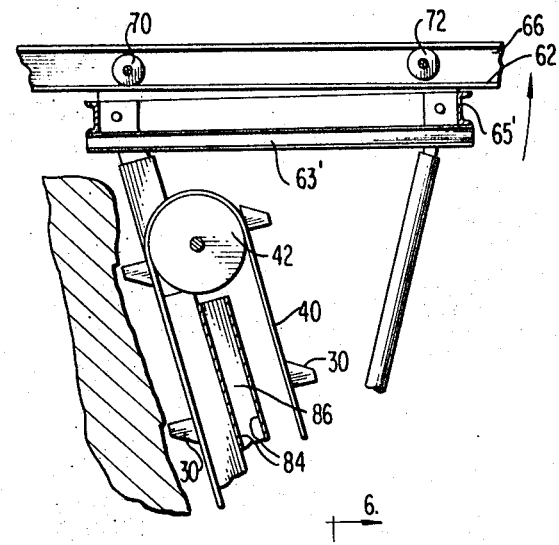
FIG. 3 is a fragmental elevational view of an overhead carriage included in the apparatus and shown in the position with its rear rollers raised from an associated overhead track.

In operation, bucket members 30, during their upward movement against the ice pile, serve to pick up ice with prongs 39 serving to loosen and scarify the ice to facilitate the pickup. As buckets 30 move about upper sprockets 42, the ice will be dropped therefrom into the mouth of chute 80 and then conveyed by gravity to the outlet 82 of the chute after which the ice will be deposited on drive screw 26 for removal out of the ice room through discharge passage 16. In addition carriage 60 will be moving at a controlled speed along the overhead track to gradually feed bucket members 30 into the ice pile as shown in FIG. 1. The pulley transmissions are calculated so that carriage 60 will not over feed buckets 30 into the ice. However if the buckets become jammed, against the ice, the carriage will pivot about its forward end with its rear drive rollers 72 moving off the track as indicated in FIG. 3. This will produce a slipping effect in the carriage allowing the carriage and the vertical conveyor to roll slightly backwards eliminating damage to the buckets and the conveyor. If desired vertical conveyor mechanism 14 may be connected through its motor 90 and any conventional circuitry (not shown) to the motor 28 of discharge screw 26 so as to be operated upon operation of the discharge screw which may be controlled by a source outside of the plant requiring a supply of ice.

Figure 5:
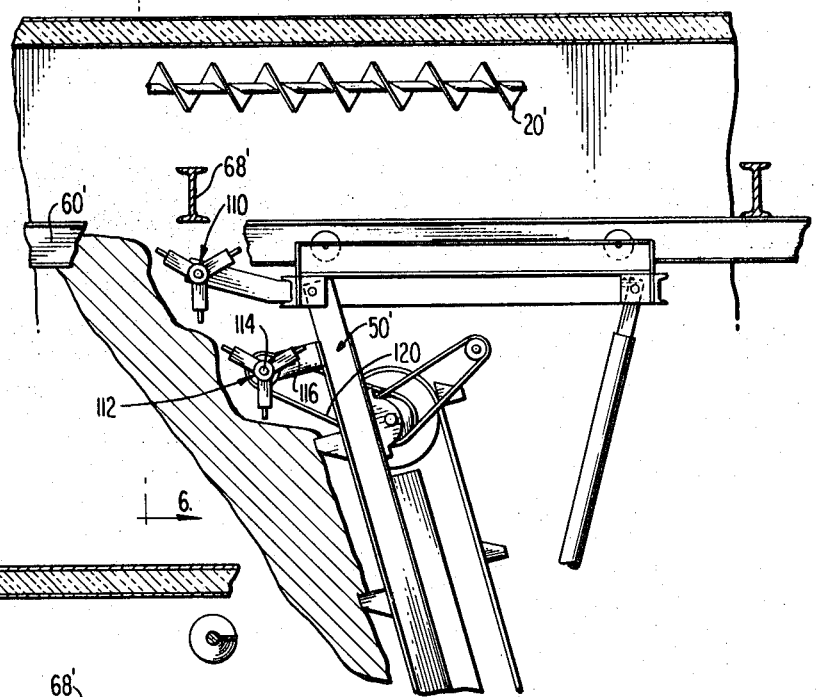
FIG. 5 is a fragmental, elevational view of a modified form of apparatus incorporating mechanisms for loosening portions of ice frozen into bulks.
Figure 6:
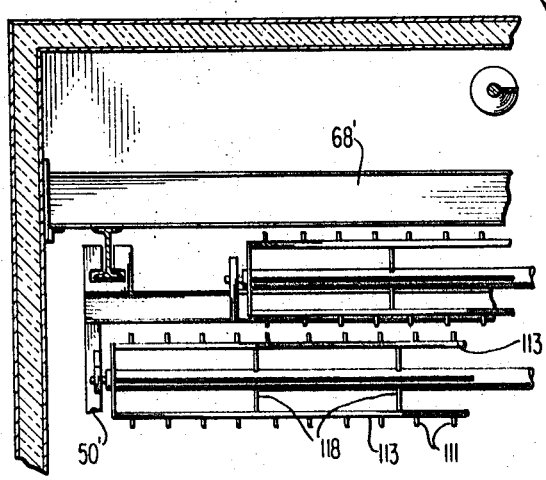
FIG. 6 is a fragmental cross-sectional view taken generally along lines 6-6 of FIG. 5.

For situations where the ice inlet screw is more remote from the vertical conveyor such as illustrated by the inlet screw 20' in FIG. 5, the vertical conveyor may be modified to provide it with one or more ice loosening or agitating mechanisms generally designated 110, 112 for loosening ice that may accumulate in the area of beams 60' and 68'. Mechanism 112 includes a drive shaft 114 suitably mounted to extend parallel and transversely relative to main frame 50' of the vertical conveyor through means of mounting arms 116 projecting forwardly from the vertical conveyor frame 50'. A plurality of scarifying elements in the form of prongs 111 are fixed to elongated blades 113 which extend parallel to drive shaft 114 at angularly spaced locations and are fixed to the drive shaft 114 by radial struts 118. Drive shaft 114 is operated to rotate prongs 111 into the ice by means of a suitable pulley and belt transmission 120 which may be driven by a connection to the upper sprocket shaft of the vertical conveyor. The other agitating mechanism 110 is situated above mechanism 114 and has the same construction except that it is spaced inwardly from the ends of the vertical conveyor frame to avoid contact with beams 60'.

In operation the agitating mechanism will be rotated against the ice at the top of the ice storage room too to loosen the same as the vertical conveyor proceeds to pick up and discharge ice as described above.

I claim:

1. In an ice storage room, apparatus for handling ice shavings comprising in combination, a first horizontal conveyor means located generally at the top of the ice room for conveying ice shavings into the ice room, a second horizontal conveyor means located generally at the bottom of the ice room for moving ice shavings out of the ice room, a vertical conveyor means extending generally between said first and second conveyor and movable horizontally to engage a pile of ice shavings for picking up a portion of ice shavings and conveying the same upwardly on to a discharge station generally at the top of the ice room, said vertical conveyor means including a vertical chute extending between the top and bottom thereof for receiving ice shavings at a discharge station and for guiding the same downwardly onto said second conveyor for ultimate deposit out of the ice room.

2. Apparatus for conveying material comprising in combination, a first conveyor means for moving the material in a generally horizontal direction, a vertical guide means for depositing material on said first conveyor means to be subsequently conveyed by said first conveyor means in a generally horizontal direction, and a second, vertical conveyor means for raising material and depositing it in the guide means whereby the material is ultimately deposited on said first conveyor means to be conveyed away from the guide means, means for moving the second conveyor means in a generally horizontal direction against a supply of material, said guide means being mounted on said second conveyor means to be movable therewith in a horizontal direction, said second conveyor means including at least one endless member having opposite runs, and article engaging means secured to said runs for engaging and raising material for deposit into said guide means, said guide means being a chute located between the runs and having a discharge outlet generally at its lower end for depositing material on the first conveyor means.

3. The combination defined in claim 2, wherein said article engaging means includes bucket members.

4. The combination defined in claim 2, wherein said discharge chute has an inlet at the top end thereof and converges downwardly from the open end thereof to the discharge outlet thereof.

5. The combination defined in claim 1, further including an agitator means mounted generally at the top of said second conveyor means for engaging the material to loosen the same for distribution by said second conveyor means.

6. A vertical conveyor for raising material in a generally vertical direction comprising in combination, at least one endless member movable in a vertical plane and means mounting the endless member to extend between a material pickup station and a material discharge station located above the pickup station, article engaging means on said endless member for engaging material at the pickup station and for discharging it at the discharge station, and guide means situated between the runs for receiving material at the discharge station and conveying the material downwardly to a transfer station, said guide means being a chute extending between the upper and lower ends of the conveyor and having an inlet located generally at the upper end of the conveyor for receiving material at the discharge station and an outlet at the lower end of the conveyor for discharging material at the transfer station.

7. The vertical conveyor defined in claim 6, wherein said article engaging means includes a bucket member having an open end which overlies the guide means at the discharge station to deposit material into the guide means at the discharge station.

8. The vertical conveyor defined in claim 7, further including a second endless member parallel to the first endless member and movable in unison therewith, and wherein said bucket member extends transversely between and is fixed to said endless members with the opposite ends of the bucket member extending beyond the endless members.

9. The conveyor defined in claim 7, wherein said bucket member further includes scarifying means fixed thereto to engage and scarify the material.

10. The conveyor defined in claim 9, wherein said scarifying means are prong members projecting outwardly from a front wall of the bucket member at longitudinally spaced locations throughout the bucket member.

11. The conveyor defined in claim 6, further including agitating means mounted at the top of the conveyor adjacent the discharge station for loosening material.

12. The conveyor defined in claim 6, further including a trolley means for moving the conveyor in a generally horizontal direction, and means connecting the endless member with respect to the trolley means for movement with the trolley means.

13. The conveyor defined in claim 12, wherein said trolley means is located above said discharge station with the conveyor suspended from the trolley means and the trolley means is adapted to move on an overhead track.

14. The conveyor defined in claim 12, further including a motor and means operatively connecting the motor to the endless member to drive the same in the vertical plane, and means operatively connecting the motor to the trolley means for moving the trolley means in a horizontal plane.

15. The conveyor defined in claim 12, wherein the runs extend at an angle to a true vertical line.

16. A method of unloading a pile of ice shavings from an ice room comprising the steps of; raising portions of the ice shavings to a discharge station generally at the top of the ice room, depositing the ice shavings at said discharge station, and then guiding the deposited ice shavings downwardly onto a horizontal conveyor at the bottom of the ice room and then moving the ice shavings out of the ice room by means of the horizontal conveyor, sequentially picking up and raising new loads of ice shavings as the previously deposited loads are guided to the horizontal conveyor, and wherein a vertical conveyor is moved against the pile of ice to effect the raising and depositing of the ice shavings, and wherein a vertical conduit on the vertical conveyor is employed to guide the ice shavings downwardly onto the horizontal conveyor.

17. The method defined in claim 16, further including the step of gradually moving the vertical conveyor against the pile of ice as the unloading operation proceeds.